United States Patent
Rico Alvarino et al.

(10) Patent No.: US 10,506,472 B2
(45) Date of Patent: Dec. 10, 2019

(54) NARROWBAND REFERENCE SIGNALS IN NON-ANCHOR RESOURCE BLOCKS

(71) Applicant: QUALCOMM Incorporated, San Diego, CA (US)

(72) Inventors: Alberto Rico Alvarino, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/802,297

(22) Filed: Nov. 2, 2017

(65) Prior Publication Data

US 2018/0124644 A1 May 3, 2018

Related U.S. Application Data

(60) Provisional application No. 62/417,264, filed on Nov. 3, 2016.

(51) Int. Cl.
*H04W 4/00* (2018.01)
*H04W 28/16* (2009.01)
(Continued)

(52) U.S. Cl.
CPC ........... *H04W 28/16* (2013.01); *H04L 5/0048* (2013.01); *H04W 28/18* (2013.01);
(Continued)

(58) Field of Classification Search
CPC . H04W 28/16; H04W 28/18; H04W 52/0209; H04W 72/042; H04W 72/0473;
(Continued)

(56) References Cited

U.S. PATENT DOCUMENTS

| 2010/0034163 A1* | 2/2010 | Damnjanovic ... H04W 72/0453 370/329 |
| 2010/0227569 A1* | 9/2010 | Bala ..................... H04L 5/0007 455/73 |

(Continued)

OTHER PUBLICATIONS

Ericcson: "NB-IoT Paging on Non-Anchor PRBs", 3GPP Draft; R1-1608704, NB-IoT Paging on Non-Anchor PRBs, 3rd Generation Partnership Project (3GPP), Mobile Competence Centre, 650 Route Des Lucioles, F-06921, Sophia-Antipolis Cedex; France, vol. RAN WG1, No. Lisbon, Portugal, Oct. 10, 2016-Oct 14, 2016, Oct. 9, 2016 (Oct. 9, 2016), XP051148762, Retrieved from the Internet: URL:http://www.3gpp.org/ftp/Meetings_3GPP_SYNC/RAN1/Docs/, pp. 1-5, [retrieved on Oct. 9, 2016].

(Continued)

*Primary Examiner* — Stephen M D Agosta
(74) *Attorney, Agent, or Firm* — Patterson & Sheridan, LLP

(57) ABSTRACT

Certain aspects of the present disclosure generally relate to techniques for determining presence of narrowband reference signals (NRSs) in non-anchor physical resource blocks (PRBs). An exemplary method that may be performed by a user equipment (UE) includes deciding that a paging occasion (PO), a RAR transmission, or a SC-PTM transmission will occur or has occurred, determining occurrence of a narrowband reference signal (NRS) in a non-anchor resource block (RB) based on at least one of: the decision, one or more narrowband transmission parameters, or presence of one or more other transmissions in a same RB as the PO, the RAR transmission, or the SC-PTM transmission; and processing the NRS. Other aspects, embodiments, and features are also claimed and described.

28 Claims, 9 Drawing Sheets

(51) Int. Cl.
*H04W 28/18* (2009.01)
*H04W 52/02* (2009.01)
*H04W 72/04* (2009.01)
*H04L 5/00* (2006.01)
*H04W 24/08* (2009.01)
*H04W 28/06* (2009.01)

(52) U.S. Cl.
CPC ..... *H04W 52/0209* (2013.01); *H04W 72/042* (2013.01); *H04W 72/0473* (2013.01); *H04L 5/0007* (2013.01); *H04W 24/08* (2013.01); *H04W 28/06* (2013.01); *H04W 72/0453* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/26* (2018.01)

(58) Field of Classification Search
CPC . H04W 24/08; H04W 28/06; H04W 72/0453; H04L 5/0048; H04L 5/007; Y02D 70/1264; Y02D 70/26; Y02D 70/142; Y02D 70/146; Y02D 70/21; Y02D 70/00; Y02D 70/1262; Y02D 70/1242
See application file for complete search history.

(56) References Cited

U.S. PATENT DOCUMENTS

| | | | | |
|---|---|---|---|---|
| 2011/0111785 | A1* | 5/2011 | Lindoff | H04W 40/16 455/513 |
| 2013/0051214 | A1* | 2/2013 | Fong | H04W 24/10 370/216 |
| 2018/0242179 | A1* | 8/2018 | Rathonyi | H04W 24/08 |
| 2018/0249511 | A1* | 8/2018 | Rathonyi | H04W 74/0841 |

OTHER PUBLICATIONS

International Search Report and Written Opinion—PCT/US2017/059876—ISA/EPO—dated Feb. 14, 2018.
Nokia et al: "Random Access on Non-Anchor PRB for NB-IoT", 3GPP Draft; R1-1608886, 3rd Generation Partnership Project (3GPP), Mobile Competence Centre, 650 Route Des Lucioles, F-06921, Sophia-Antipolis Cedex; France, vol. RAN WG1, No. Lisbon, Portugal, Oct. 10, 2016-Oct. 14, 2016, Oct. 9, 2016 (Oct. 9, 2016), XP051148940, Retrieved from the Internet: URL:http://www.3gpp.org/ftp/Meetings_3GPP_SYNC/RAN1/Docs/, 2 pages, [retrieved on Oct. 9, 2016].

* cited by examiner

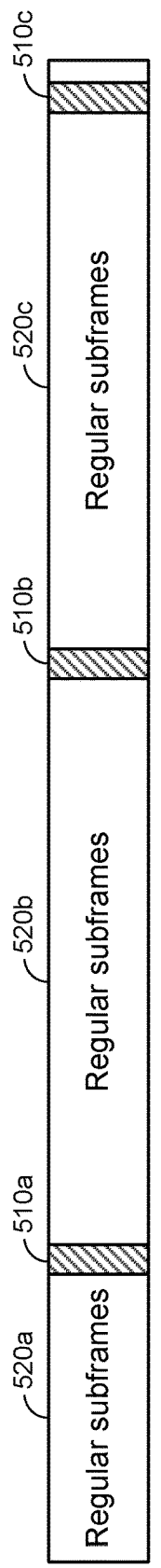
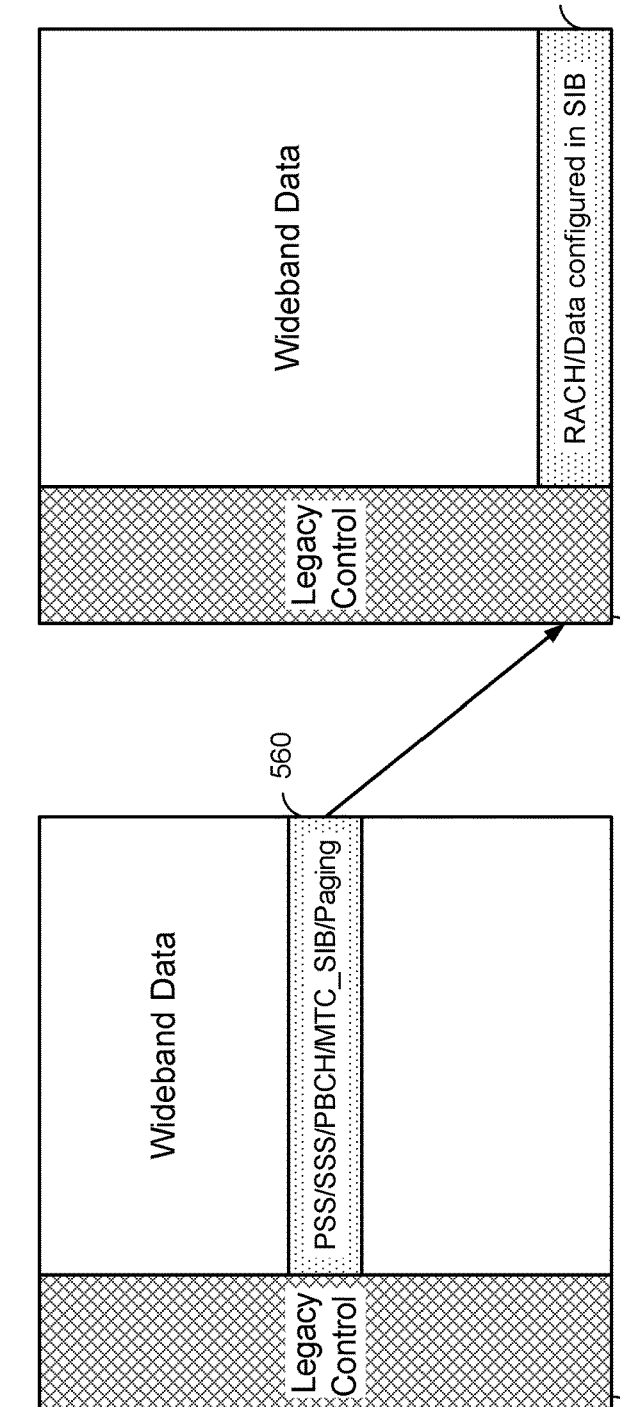

NARROWBAND REFERENCE SIGNALS IN NON-ANCHOR RESOURCE BLOCKS

CROSS-REFERENCE TO RELATED APPLICATIONS

The present Application for Patent claims priority to and benefit of U.S. Provisional Application No. 62/417,264, filed Nov. 3, 2016, which is assigned to the assignee of the present application and hereby expressly incorporated by reference herein in its entirety for all applicable purposes.

TECHNICAL FIELD

Certain aspects of the present disclosure generally relate to wireless communications, and more specifically, to techniques for determining presence of narrowband reference signals (NRSs) in non-anchor physical resource blocks (PRBs). Embodiments enable and provide circuits, devices, systems, and methods to gain network flexibility with respect to the presence of NRS, while at the same time enabling communication devices (e.g., UEs) to perform time/frequency tracking yielding improvements in mobility scenarios and efficient use of power resources.

INTRODUCTION

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

In some cases, devices, such as MTC and other types of devices, may communicate using a narrowband (NB) region of wider system bandwidth. Utilizing a narrowband region may present challenges for various procedures, such as positioning procedures where positioning reference signals are used to track a location (and/or movement) of devices within a network.

BRIEF SUMMARY OF SOME EXAMPLES

The systems, methods, and devices of the disclosure each have several aspects, no single one of which is solely responsible for its desirable attributes. Without limiting the scope of this disclosure as expressed by the claims which follow, a brief summary of features will now be discussed. After considering this discussion, and particularly after reading the section entitled "Detailed Description" one will understand how the features of this disclosure enable and provide advantages that include conserving transmission resources in wireless communication systems and yielding improved user experience.

Aspects of the present disclosure provide a method for wireless communications performed by a user equipment (UE). The method generally includes deciding that a paging occasion (PO), a random access response (RAR) transmission, or a single cell point to multipoint (SC-PTM) transmission will occur or has occurred and determining occurrence of a narrowband reference signal (NRS) in a non-anchor resource block (RB). In some scenarios, non-anchor resource blocks may lack certain signals (e.g., NPSS, NSSS, and/or NPBCH). Method embodiments can also include making the determination based on at least one of, the decision regarding a PO, one or more narrowband transmission parameters, or presence of one or more other transmissions in a same RB as the PO, the RAR transmission, or the SC-PTM transmission. Method embodiments can also include processing the NRS (e.g., determining a frequency adjustment of a transmitter and/or receiver based on the NRS or determining a time tracking adjustment based on the NRS).

Aspects of the present disclosure provide a method for wireless communications performed by a base station (BS). The method generally includes determining whether to schedule one or more transmissions to a user equipment (UE); deciding that a paging occasion (PO), a random access response (RAR) transmission, or a single cell point to multipoint (SC-PTM) transmission will occur or has occurred; determining to transmit a narrowband reference signal (NRS) in a non-anchor resource block (RB) based on at least one of: the decision, one or more narrowband transmission parameters, or the determination of whether to schedule the one or more transmissions to the UE; and transmitting the NRS in the non-anchor RB.

Aspects of the present disclosure provide an apparatus for wireless communications. The apparatus generally includes a processor configured to: decide that a paging occasion (PO), a random access response (RAR) transmission, or a single cell point to multipoint (SC-PTM) transmission will occur or has occurred; determine occurrence of a narrowband reference signal (NRS) in a non-anchor resource block (RB) based on at least one of: the decision, one or more narrowband transmission parameters, or presence of one or more other transmissions in a same RB as the PO, the RAR transmission, or the SC-PTM transmission; and process the NRS; and a memory coupled with the processor.

Aspects of the present disclosure provide an apparatus for wireless communications. The apparatus generally includes a processor configured to: determine whether to schedule one or more transmissions to a user equipment (UE); decide that a paging occasion (PO), a random access response (RAR) transmission, or a single cell point to multipoint (SC-PTM) transmission will occur or has occurred; determine to transmit a narrowband reference signal (NRS) in a non-anchor resource block (RB) based on at least one of: the decision, one or more narrowband transmission parameters, or the determination of whether to schedule the one or more transmissions to the UE; and transmit the NRS in the non-anchor RB; and a memory coupled with the processor.

Aspects of the present disclosure provide an apparatus for wireless communications. The apparatus generally includes means for deciding that a paging occasion (PO), a random access response (RAR) transmission, or a single cell point to multipoint (SC-PTM) transmission will occur or has occurred; means for determining occurrence of a narrowband reference signal (NRS) in a non-anchor resource block (RB) based on at least one of: the decision, one or more narrowband transmission parameters, or presence of one or more other transmissions in a same RB as the PO, the RAR transmission, or the SC-PTM transmission; and means for processing the NRS.

Aspects of the present disclosure provide an apparatus for wireless communications. The apparatus generally includes means for determining whether to schedule one or more transmissions to a user equipment (UE); means for deciding that a paging occasion (PO), a random access response (RAR) transmission, or a single cell point to multipoint (SC-PTM) transmission will occur or has occurred; means for determining to transmit a narrowband reference signal (NRS) in a non-anchor resource block (RB) based on at least one of: the decision, one or more narrowband transmission parameters, or the determination of whether to schedule the one or more transmissions to the UE; and means for transmitting the NRS in the non-anchor RB.

Aspects of the present disclosure provide a computer-readable medium comprising instructions for wireless communications. The instructions, when executed by a processor, cause the processor to execute operations generally including: deciding that a paging occasion (PO), a random access response (RAR) transmission, or a single cell point to multipoint (SC-PTM) transmission will occur or has occurred; determining occurrence of a narrowband reference signal (NRS) in a non-anchor resource block (RB) based on at least one of: the decision, one or more narrowband transmission parameters, or presence of one or more other transmissions in a same RB as the PO, the RAR transmission, or the SC-PTM transmission; and processing the NRS.

Aspects of the present disclosure provide a computer-readable medium comprising instructions for wireless communications. The instructions, when executed by a processor, cause the processor to execute operations generally including: determining whether to schedule one or more transmissions to a user equipment (UE); deciding that a paging occasion (PO), a random access response (RAR) transmission, or a single cell point to multipoint (SC-PTM) transmission will occur or has occurred; determining to transmit a narrowband reference signal (NRS) in a non-anchor resource block (RB) based on at least one of: the decision, one or more narrowband transmission parameters, or the determination of whether to schedule the one or more transmissions to the UE; and transmitting the NRS in the non-anchor RB.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments it should be understood that such exemplary embodiments can be implemented in varying shapes, sizes, layouts, arrangements, circuits, devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5A and 5B illustrate an example of MTC co-existence within a wideband system, such as LTE, in accordance with certain aspects of the present disclosure.

DETAILED DESCRIPTION

Figure 1:
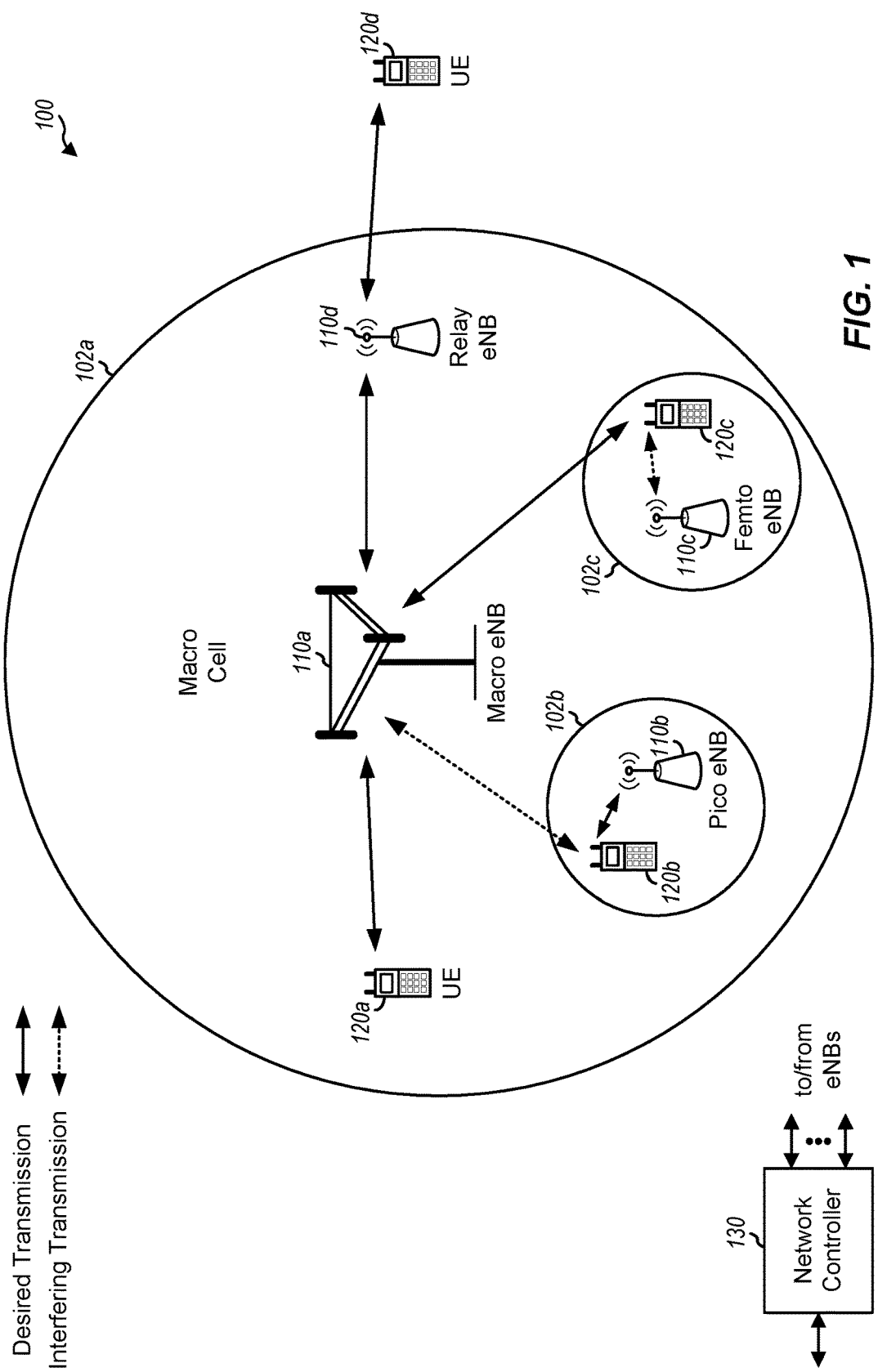
FIG. 1 is a block diagram conceptually illustrating an example wireless communication network, in accordance with certain aspects of the present disclosure.

Aspects of the present disclosure provide techniques and apparatus for determining occurrence of narrowband reference signals (NRS) in non-anchor physical resource blocks (PRBs). A non-anchor PRB is a PRB over which a UE does not perform initial access and typically does not contain (e.g., these signals are not transmitted by BSs in non-anchor PRBs) narrowband primary synchronization signals (NPSS), narrowband secondary synchronization signals (NSSS), and narrowband physical broadcast channels (NPBCH). As is discussed, NRS may be transmitted by a base station in a non-anchor PRB for use by a UE operating in the non-anchor PRB. Similarly, a UE may determine occurrence of an NRS in a non-anchor PRB and process the NRS.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc.

The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used or implemented in a wide variety of arrangements and settings. This includes the wireless networks and radio technologies mentioned above as well as other wireless networks and radio technologies (including, for example, 5G or 5G/New Radio systems). For clarity, certain aspects of the techniques are described below for LTE/LTE-A, and LTE/LTE-A terminology is used in much of the description below. LTE and LTE-A are referred to generally as LTE.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc.

FIG. 1 illustrates an example wireless communication network 100 with base stations (BSs) and user equipments (UEs), in which aspects of the present disclosure may be practiced.

For example, one or more paging procedure enhancements for certain UEs (e.g., LC MTC UEs, LC eMTC UEs, etc.) in the wireless communication network 100 may be supported. According to the techniques presented herein, the BSs and LC UE(s) in the wireless communication network 100 may be able to determine, from the available system bandwidth supported by the wireless communication network 100, which narrowband region(s) the LC UE(s) should monitor for a bundled paging message transmitted from the BSs in the wireless communication network 100. Also, according to techniques presented herein, the BSs and/or LC UE(s) in the wireless communication network 100 may be able to determine and/or adapt the bundling size for the paging message based on one or more triggers in the wireless communication network 100.

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, navigation devices, gaming devices, cameras, a vehicular device, a drone, a robot/robotic device, a wearable device (e.g., smart watch, smart clothing, smart wristband, smart ring, smart bracelet, smart glasses, virtual reality goggles), a medical device, a healthcare device, etc. MTC UEs include devices such as sensors, meters, monitors, location tags, drones, trackers, robots/robotic devices, etc. UEs (e.g., MTC devices) may be implemented as internet of everything (IoE) or internet of things (IoT) (e.g., narrowband IoT (NB-IoT)) devices.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
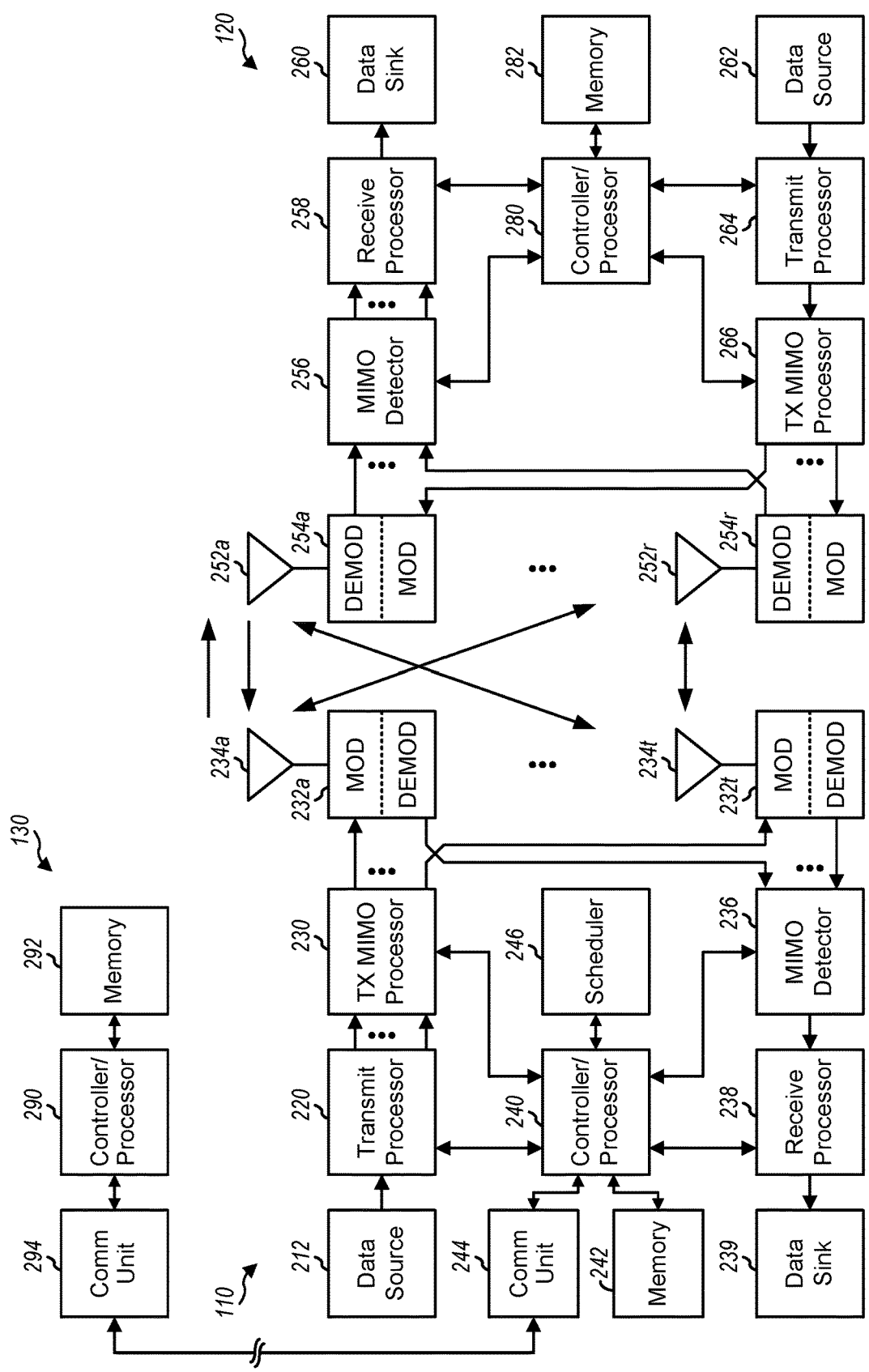
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations illustrated in FIGS. 10, 13, 14, 17 and/or other processes for the techniques described herein. Similarly, controller/processor 280 and/or other processors and modules at UE 120 may perform or direct operations illustrated in FIGS. 11, 12, 15, 16 and/or processes for the techniques described herein. Memories 242 and 282 may store data and program codes for BS 110 and UE 120, respectively. A scheduler 246 may schedule UEs for data transmission on the downlink and/or uplink.

Figure 3:
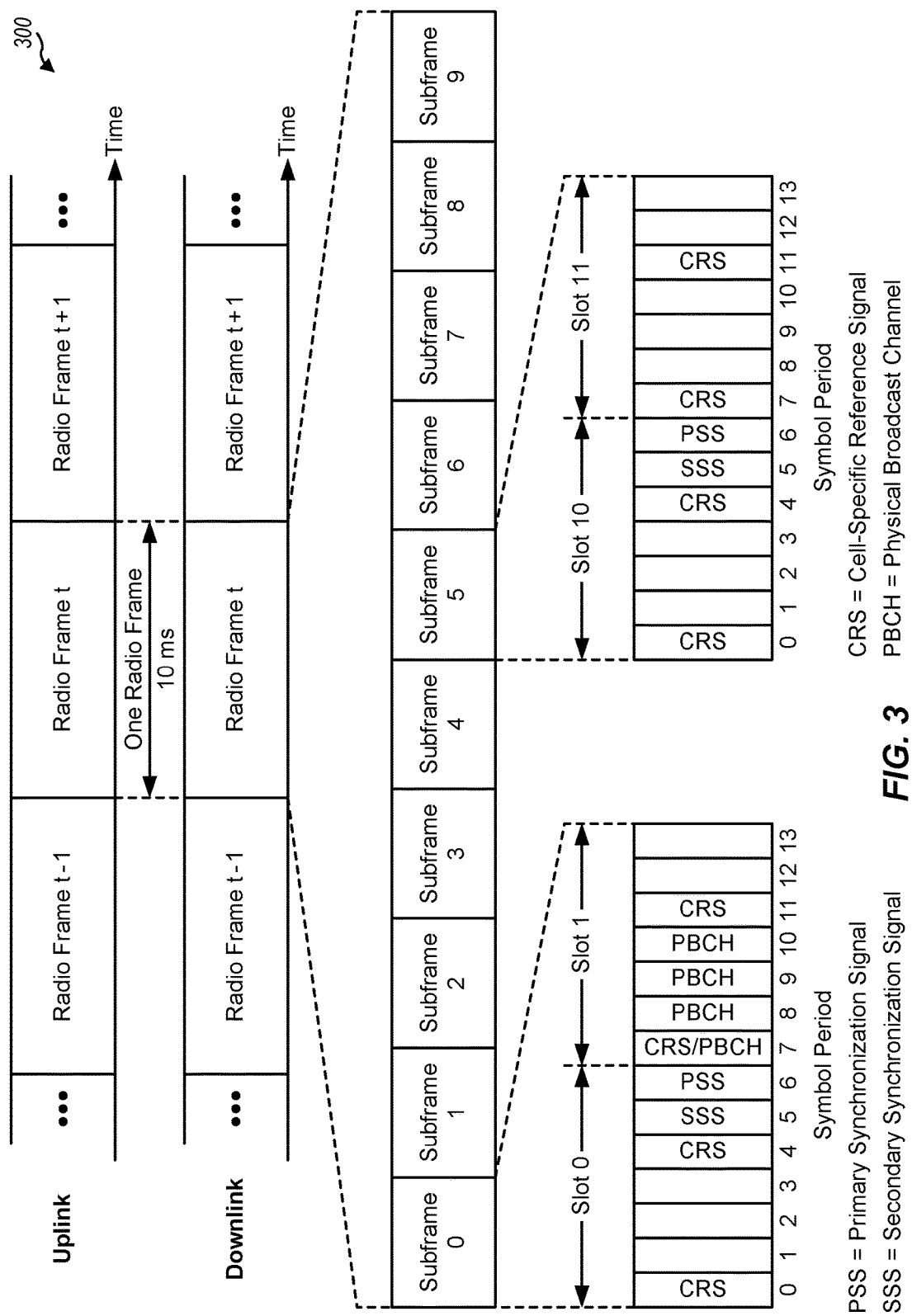
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) and narrowband SIBs (SIB-NBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
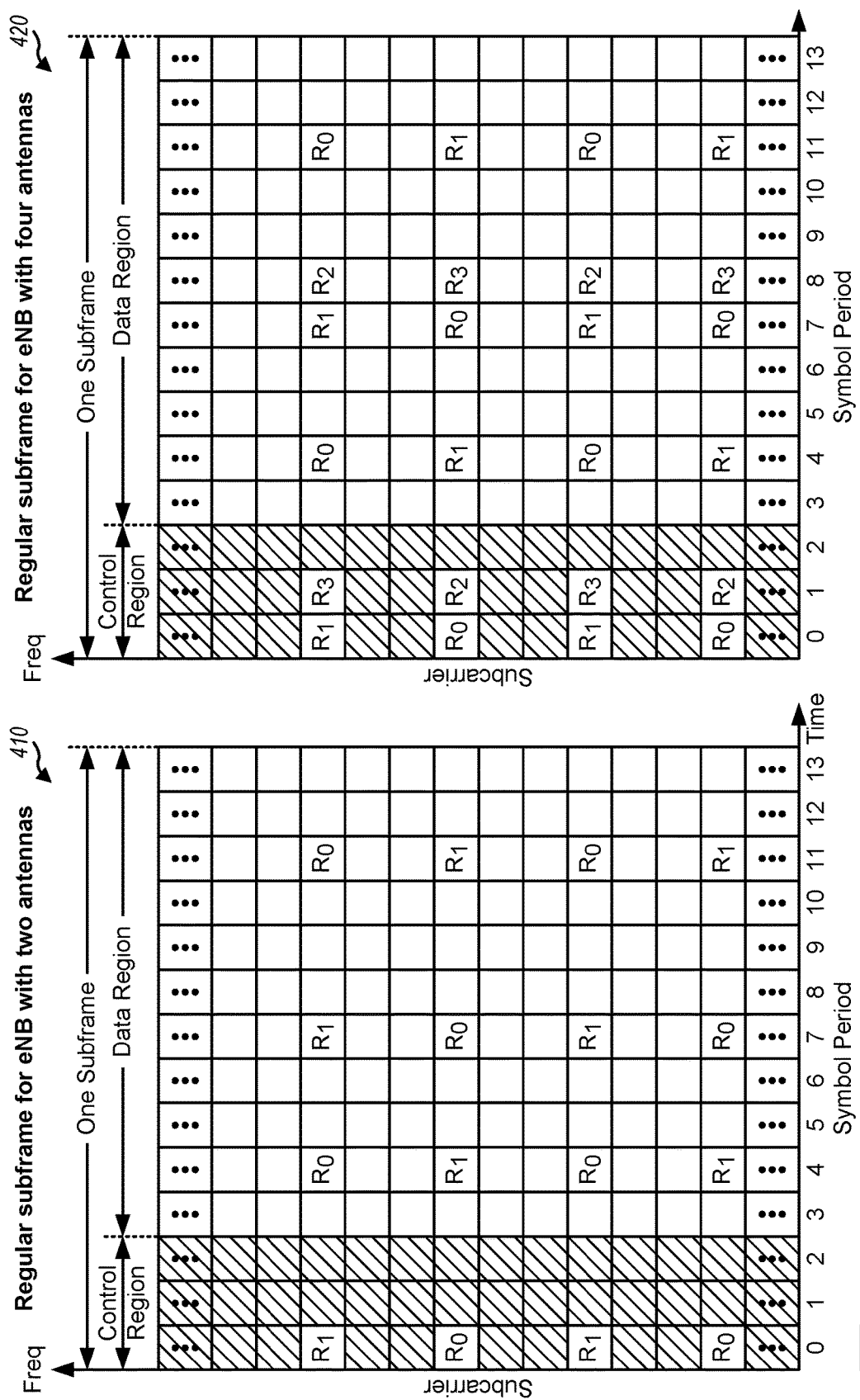
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Example Narrowband Coexistence within a Wideband System

As mentioned above, narrowband (e.g., MTC or NB-IoT) operation may be supported in the wireless communication network (e.g., in coexistence with LTE or some other RAT). FIGS. 5A and 5B, for example, illustrate an example of how LC UEs in MTC operation may co-exist within a wideband system, such as LTE.

As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 (e.g., spanning no more than 6 RBs of the wideband data) of a subframe 552 may be monitored by one or more LC UEs for either a PSS, SSS, PBCH, MTC signaling, or paging transmission from a BS in the wireless communication network. As also shown in FIG. 5B, a second narrowband region 562 (e.g., also spanning no more than 6 RBs of the wideband data) of a subframe 554 may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

Although the examples described herein assume a narrowband of 6 RBs, those skilled in the art will recognize that the techniques presented herein may also be applied to different sizes of narrowband regions.

Example Narrowband Management for MTC

As mentioned above, in certain systems, e.g., such as LTE Rel-12, narrowband operation for MTC (e.g., eMTC) may be supported. A cell supporting narrowband operation for MTC may have different system bandwidths for downlink (DL) and uplink (UL) operations. A cell having different DL and UL system bandwidths (SBs) may organize the DL system bandwidth into narrowband regions in a manner different than the manner used to organize the UL system bandwidth into narrowband regions. Accordingly, aspects of the present disclosure provide techniques for organizing a DL system bandwidth and an UL system bandwidth into narrowband regions.

A cell supporting narrowband operation for MTC and legacy UEs may receive legacy PUCCH transmissions from the legacy UEs. Legacy PUCCH transmissions may be transmitted at either or both edges of a UL system bandwidth of a cell. Accordingly, aspects of the present disclosure provide techniques to reserve transmission resources included in an UL narrowband region for use by legacy PUCCH transmissions. Similar reservations may also be applied to a DL narrowband region for use by other legacy DL signals or channels.

A cell supporting narrowband operations for MTC may also support transmission of sounding reference signals (SRS). The current minimum defined bandwidth for transmission of SRS is four RBs. However, as mentioned above, the bandwidth of narrowband regions is six RBs. The fact that six RBs are not divisible by four RBs presents challenges in managing SRS transmissions using four RBs in six-RB based narrowband operations. Accordingly, aspects of the present disclosure provide techniques for assigning transmission resources for transmission of SRS in a cell supporting narrowband operations (e.g., for MTC).

A cell operating with FDD may have a DL system bandwidth that is of a different size than the UL system bandwidth of the cell. For example, a cell may perform DL operations in a system bandwidth of ten MHz and UL operations in a five MHz system bandwidth. To support MTC operations and MTC UEs, the cell may organize the DL system bandwidth and the UL system bandwidth into narrowband regions, or narrowband regions. An eNB or other BS controlling the cell may assign a DL narrowband region to a MTC UE for the MTC UE to monitor for signals from the eNB. Similarly, the eNB (or other BS) may assign a UL narrowband region to the MTC UE for the MTC to use when transmitting UL signals. In the example, the cell may organize the DL system bandwidth into eight DL narrowband regions while organizing the UL system bandwidth into four UL narrowband regions.

When a BS (e.g., an eNB or a cell) supports MTC UEs with the DL system bandwidth and UL system bandwidth of the cell organized into narrowband regions, the BS may establish a mapping between DL narrowband regions and UL narrowband regions, so that assigning a DL narrowband region to an MTC UE implies an assignment of a UL narrowband region to that MTC UE. Having a mapping allows the BS to simplify scheduling of resources in the cell, e.g., the BS can expect ACK/NAKs for transmissions on a DL narrowband region to an MTC UE on the corresponding UL narrowband region. Likewise, an MTC UE monitors for DL transmissions on the assigned DL narrowband region for the MTC UE and responds with transmissions on the corresponding UL narrowband region.

According to aspects of the present disclosure, a technique for mapping UL and DL narrowband regions by a BS is provided. A BS may determine a minimum size of the UL system bandwidth and the DL system bandwidth supported by the BS, determine a number of narrowband regions that can be organized in the determined size, and then organize both the DL system bandwidth and the UL system bandwidth in that number of narrowband regions. The BS may then map each DL narrowband region to one UL narrowband region. For example, a cell may perform DL operations in a system bandwidth of ten MHz and UL operations in a five MHz system bandwidth. In the example, the BS may determine that the minimum size of the UL system bandwidth and the DL system bandwidth is five MHz, and then determine that the BS can organize four narrowband regions in a five MHz system bandwidth. Still in the example, the BS may then organize four DL narrowband regions in the DL system bandwidth and four UL narrowband regions in the UL system bandwidth, and map each DL narrowband region to one UL narrowband region.

Figure 6:
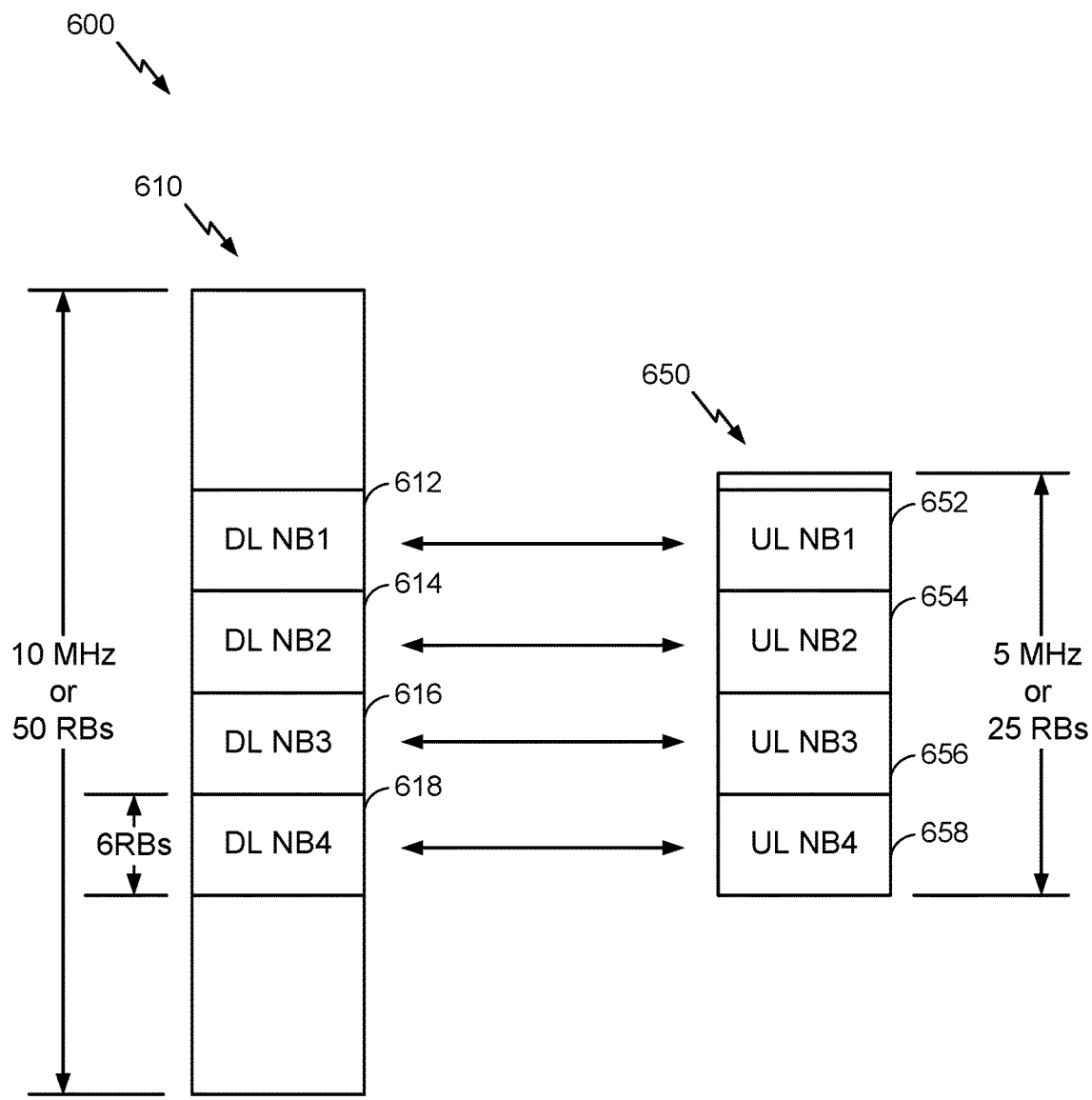
FIG. 6 illustrates an exemplary mapping of DL narrowband regions to UL narrowband regions, in accordance with certain aspects of the present disclosure.

FIG. 6 illustrates an exemplary mapping 600 of DL narrowband regions to UL narrowband regions, as described above. Such a mapping may be employed by eNB 110a in FIG. 1. While FIG. 6 shows the DL system bandwidth 610 and the UL system bandwidth 650 as apparently in the same frequency ranges, the DL system bandwidth and the UL system bandwidth are in different frequency ranges in a cell using FDD. DL system bandwidth 610 is ten MHz or fifty RBs wide, and UL system bandwidth 650 is five MHz or twenty-five RBs wide. A BS supporting MTC UEs while operating DL system bandwidth 610 and UL system bandwidth 650 may determine that the UL system bandwidth 650 is smaller than DL system bandwidth 610 (the 5 MHz size of UL system bandwidth 650 is the minimum size of the UL system bandwidth 650 and the DL system bandwidth 610). The BS may then determine that the BS can organize four narrowband regions 652, 654, 656, and 658 from the UL system bandwidth 650. The BS may then determine to organize four narrowband regions from the DL system bandwidth, and organize DL narrowband regions 612, 614, 616, and 618 from the DL system bandwidth. The BS may then map DL narrowband region 612 to UL narrowband region 652, DL narrowband region 614 to UL narrowband region 654, DL narrowband region 616 to UL narrowband region 656, and DL narrowband region 618 to UL narrowband region 658.

As mentioned above, LC MTC UEs were introduced in LTE Rel-12. Additional enhancements may be made in LTE Release 13 (Rel-13) to support MTC operations. For example, MTC UEs may be able to operate (e.g., monitor, transmit, and receive) in a narrowband region of 1.4 MHz or six RBs within wider system bandwidths (e.g., 1.4 MHz, 3 MHz, 5 MHz, 10 MHz, 15 MHz, 20 MHz). As a second example, base stations and MTC UEs may support coverage enhancements (CE) of up to 20 dB by some techniques, for example bundling. Coverage enhancement may also be referred to as coverage extension and range extension.

When a UE needs to connect with a cell to which the UE is not currently connected, the UE and the cell engage in an exchange of messages referred to as a random access channel (RACH) procedure. In a RACH procedure, a UE transmits a physical random access channel (PRACH) signal (sometimes referred to as Msg1 of a RACH procedure) in a set of transmission resources reserved for PRACH signals, then the cell responds to the PRACH signal with a random access response (RAR) message (sometimes referred to as Msg2 of a RACH procedure) carried on the downlink shared channel (DL-SCH). The UE responds to the RAR message with an RRC connection request message (sometimes referred to as Msg3 of a RACH procedure), and the cell responds with a contention resolution message (sometimes referred to as Msg4 of a RACH procedure). The UE is then connected with the cell.

In current (e.g., LTE Rel-12) wireless technologies, a PRACH signal transmitted by an MTC device comprises one group of 4 symbols in a single tone and using 2 hopping values.

As will be described in further details below, according to certain aspects of the present disclosure, a PRACH signal may be utilized in an uplink-based positioning procedure.

Example Narrowband Reference Signals in Non-Anchor Resource Blocks

In LTE Release 13 (Rel-13) communications standards related to narrowband Internet of Things (NB-IoT) communications, a UE can be configured to operate in a non-anchor physical resource block (PRB) after connection establishment. A non-anchor PRB is a PRB over which the UE did not perform initial access and typically does not contain (e.g., these signals are not transmitted by BSs in non-anchor PRBs) narrowband primary synchronization signals (NPSS), narrowband secondary synchronization signals (NSSS), and narrowband physical broadcast channels (NPBCH). A UE that is configured to operate in a non-anchor PRB typically receives this configuration in a unicast transmission, for example, the UE may receive the configuration via an RRC reconfiguration.

In LTE Rel-14, the concept of non-anchor PRB is extended to paging and random access. That is, UEs may receive paging messages, transmit random access channel (RACH) messages, and receive random access response (RAR) messages via non-anchor PRBs. These configurations to monitor for paging messages and perform RACH procedures in non-anchor PRBs may be broadcast by a base station, e.g., in SIB messages. All UEs in the cell typically receive (e.g. from broadcast messages) information regarding the existence of these non-anchor PRBs and their usage for RACH procedures and paging.

According to aspects of the present disclosure, BSs and UEs may determine the presence of narrowband reference signals (NRS) in these PRBs. NRS may not be transmitted continuously in every non-anchor PRB in a cell, because if there is no UE (e.g., an MTC UE) configured to monitor a non-anchor PRB, then no NRS is necessary in the non-anchor PRB, and transmission resources that would be used to convey the NRS may be used instead for communications with other UEs (e.g. wideband UEs).

In aspects of the present disclosure, the presence or absence of NRS in non-anchor PRBs may have an impact on UE behavior regarding mobility, time tracking, and/or frequency tracking. For example, a UE may use NRS in non-anchor PRBs as a basis for time tracking, and if the UE does not detect NRS in a non-anchor PRB, the UE may retune a receiver in order to detect NRS (e.g., to use for time tracking) in other PRBs.

According to aspects of the present disclosure, techniques to gain network flexibility with respect to the presence of NRS, while at the same time enabling a UE to perform time and frequency tracking, are provided. That is, the techniques may enable network entities to not transmit NRS in every non-anchor PRB, while still transmitting sufficient NRS to enable supported UEs to perform time and frequency tracking.

Figure 7:
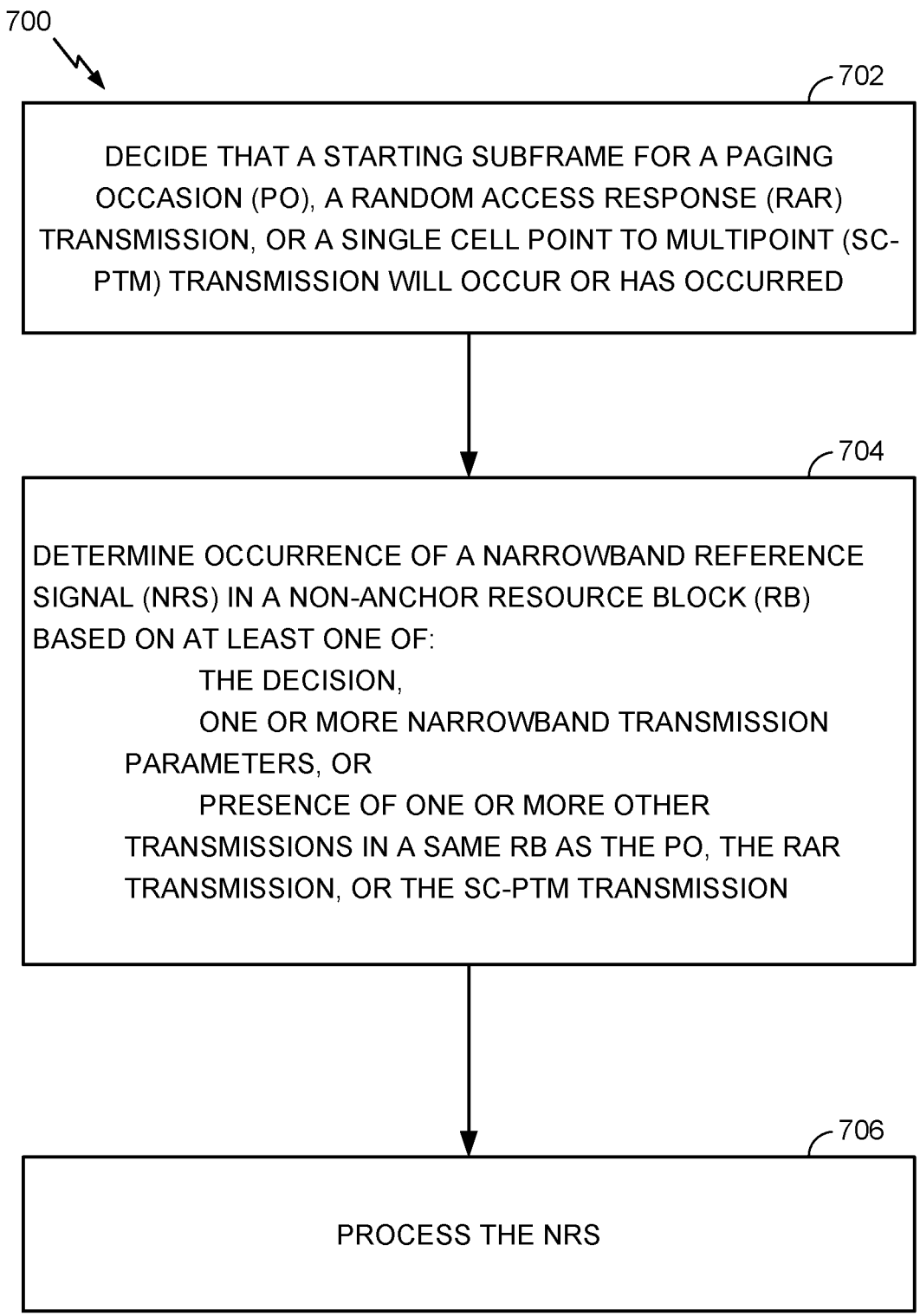
FIG. 7 illustrates example operations for wireless communications that may be performed by a UE, in accordance with certain aspects of the present disclosure.

FIG. 7 illustrates example operations 700 for wireless communications that may be performed by a UE, such as UE 120a shown in FIG. 1, in accordance with certain aspects of the present disclosure.

The operations 700 begin, at block 702, by the UE deciding that a paging occasion (PO), a random access response (RAR) transmission, or a single cell point to multipoint (SC-PTM) transmission will occur or has occurred. For example, UE 120a (see FIG. 1) decides that a paging occasion has occurred in a current subframe.

At block 704, operations 700 continue with the UE determining occurrence of a narrowband reference signal (NRS) in a non-anchor resource block (RB). This determination may be based on a number of factors, including a decision regarding occurrence or non-occurrence of a PO, one or more narrowband transmission parameters, or presence of one or more other transmissions in a same RB as the PO, the RAR transmission, or the SC-PTM transmission. As used herein, a non-anchor RB is an RB in which NPSS, NSSS, and NPBCH signal do not occur (e.g., not in subframes 0 or 5 of a frame, as shown in FIG. 3). Continuing the example above, the UE 120a determines that NRS occur in a non-anchor RB based on the PO occurring in the current subframe.

At block 706, the UE processes the NRS. Processing the NRS may include, for example, using the NRS to determine a frequency adjustment for a transmitter or receiver of the UE and/or using the NRS to determine an update to an absolute time tracked by the UE. Continuing the example above, the UE 120a may process the NRS in the non-anchor RB by determining a frequency adjustment for a receiver of the UE based on the NRS.

Figure 8:
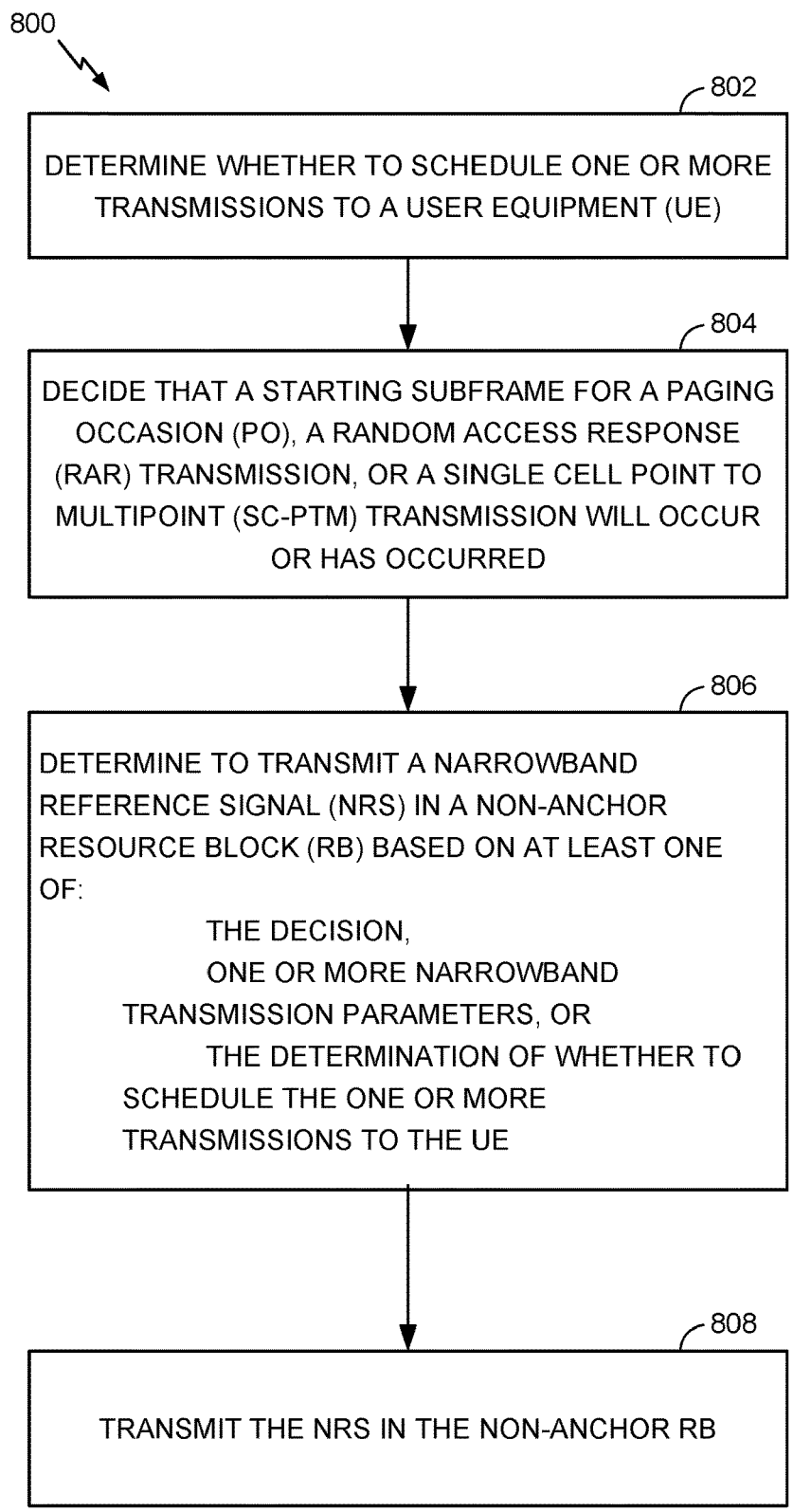
FIG. 8 illustrates example operations for wireless communications that may be performed by a BS, in accordance with certain aspects of the present disclosure.

FIG. 8 illustrates example operations 800 for wireless communications that may be performed by a BS, such as BS 110a shown in FIG. 1, in accordance with certain aspects of the present disclosure.

The operations 800 begin, at 802, block by the BS determining whether to schedule one or more transmissions to a user equipment (UE). For example, BS 110a (see FIG. 1) determines to schedule an NPDCCH to UE 120a.

At block 804, the BS decides that a paging occasion (PO), a random access (RAR) transmission, or a single cell point to multipoint (SC-PTM) transmission will occur or has occurred. Continuing the above example, the BS 110a decides that a PO for UE 120a occurs in a current subframe.

Operations 800 continue at block 806 with the BS determining to transmit a narrowband reference signal (NRS) in a non-anchor resource block (RB) based on at least one of: the decision, one or more narrowband transmission parameters, or the determination of whether to schedule the one or more transmissions to the UE. As used herein, a non-anchor RB is an RB in which NPSS, NSSS, and NPBCH signal do not occur (e.g., not in subframes 0 or 5 of a frame, as shown in FIG. 3). Continuing the example from above, the BS 110a determines to transmit NRS in a non-anchor RB based on the determination in block 802 to schedule an NPDCCH to the UE 120a in the non-anchor RB.

At block 808, the BS transmits the NRS in the non-anchor RB. Still in the example from above, the BS 110a transmits NRS in the same non-anchor RB that the BS is using to transmit the NPDCCH to the UE 120a.

According to aspects of the present disclosure, a UE may assume that NRS is present in periods (e.g., subframes) around any paging occasion (PO), random access response (RAR) transmission (e.g., from a base station responding to a previous RACH by the UE), or single cell point to multipoint (SC-PTM) transmission. Assuming (by the UE) the presence of NRS may include processing the NRS, as described above with reference to FIG. 7. For other subframes not around the paging occasion, RAR transmission, or SC-PTM transmission, the UE may not assume the presence of NRS. By assuming that NRS is present around any paging occasion, RAR transmission, or SC-PTM transmission, a UE can wake up to monitor for pages or SC-PTM transmissions, make measurements of the NRS for mobility, tune time tracking loops, and/or tune frequency tracking loops without retuning (e.g., retuning a receiver of the UE) to the anchor carrier. Similarly, a UE can wake up to receive a RAR transmission and make measurements of the NRS for mobility, tune time tracking loops, and/or tune frequency tracking loops without retuning (e.g., retuning a receiver of the UE) to the anchor carrier.

According to aspects of the present disclosure, periods (e.g., subframes) around any paging occasion, RAR transmission, or SC-PTM transmission (as mentioned above) may be determined (e.g., by a UE or a BS) to include M subframes before the start of the paging occasion, RAR transmission, or SC-PTM transmission, where M may be a narrowband transmission parameter. M may be determined by a UE by receiving an indication of M in a SIB, or a UE may determine M based on a network communications standard. A BS may determine M based on a network communications standard. A UE assuming presence of NRS before a paging occasion may enable the UE to perform measurements, start channel estimation, start time tracking, and/or start frequency tracking before attempting to detect a page and/or receive other communications from a BS.

According to aspects of the present disclosure, periods (e.g., subframes) around any paging occasion, RAR transmission, or SC-PTM transmission may be determined to include time periods occurring during a worst case (e.g., longest) narrowband physical downlink control channel (NPDCCH) repetition. That is, the time periods around any paging occasion (during which a UE may assume NRS and/or a BS may transmit NRS) may include all of the subframes when an NPDCCH might be transmitted (e.g., by a BS) to the UE. This time period around a paging occasion (e.g., a duration) may also include any invalid DL subframes over which the transmission of NPDCCH may be postponed. A UE in bad coverage conditions (e.g., in a large coverage enhancement (CE) location) might need to receive a large number (e.g., 2000) of repetitions of NPDCCH in order to successfully decode the NPDCCH. The UE in bad coverage conditions might also need to receive and process a large number (e.g., 2000) of NRS to perform measurements (e.g., measurements of frequency or time drift). Even if a UE is not in bad coverage conditions and can decode an NPDCCH with a smaller number of repetitions, it is desirable that the number of subframes with NRS be known a priori to the UE, and setting the number of subframes with NRS to correspond to the worst case number of NPDCCH repetitions (e.g., number of subframes) may enable the UE to know the number of subframes including NRS.

According to aspects of the present disclosure, periods (e.g., subframes) around any paging occasion, RAR transmission, or SC-PTM transmission may be determined (e.g., by a UE or BS) to include N subframes after the end of a worst case (e.g., longest) NPDCCH candidate, where N may be a narrowband transmission parameter. N may be determined by a UE by receiving an indication of N in a SIB, or a UE may determine N based on a network communications standard. A BS may determine N based on a network communications standard. Shortly after reception of an NPDCCH by a UE, the receiving UE does not know if there is any NPDSCH intended for the UE, because the UE takes some time to decode the NPDCCH and determine if the NPDCCH scheduled an NPDSCH for the UE. The value of N may be selected or determined (e.g., by a BS) such that N subframes is sufficient to account for this processing delay. If there is NPDSCH scheduled (e.g., in a non-anchor RB) by a BS, then the BS also transmits NRS during the NPDSCH transmission.

According to aspects of the present disclosure, periods (e.g., subframes) around any paging occasion, RAR transmission, or SC-PTM transmission may be determined (e.g., by a UE or BS) to include X subframes after the end of an NPDSCH transmission for a UE, where X may be a narrowband transmission parameter. X may be determined by a UE by receiving an indication of M in a SIB, or a UE may determine X based on a network communications standard. A BS may determine X based on a network communications standard. In some aspects of the present disclosure, transmitting NRS in subframes after the end of an NPDSCH transmission may be not be necessary, and X may be set to zero.

Figure 9:
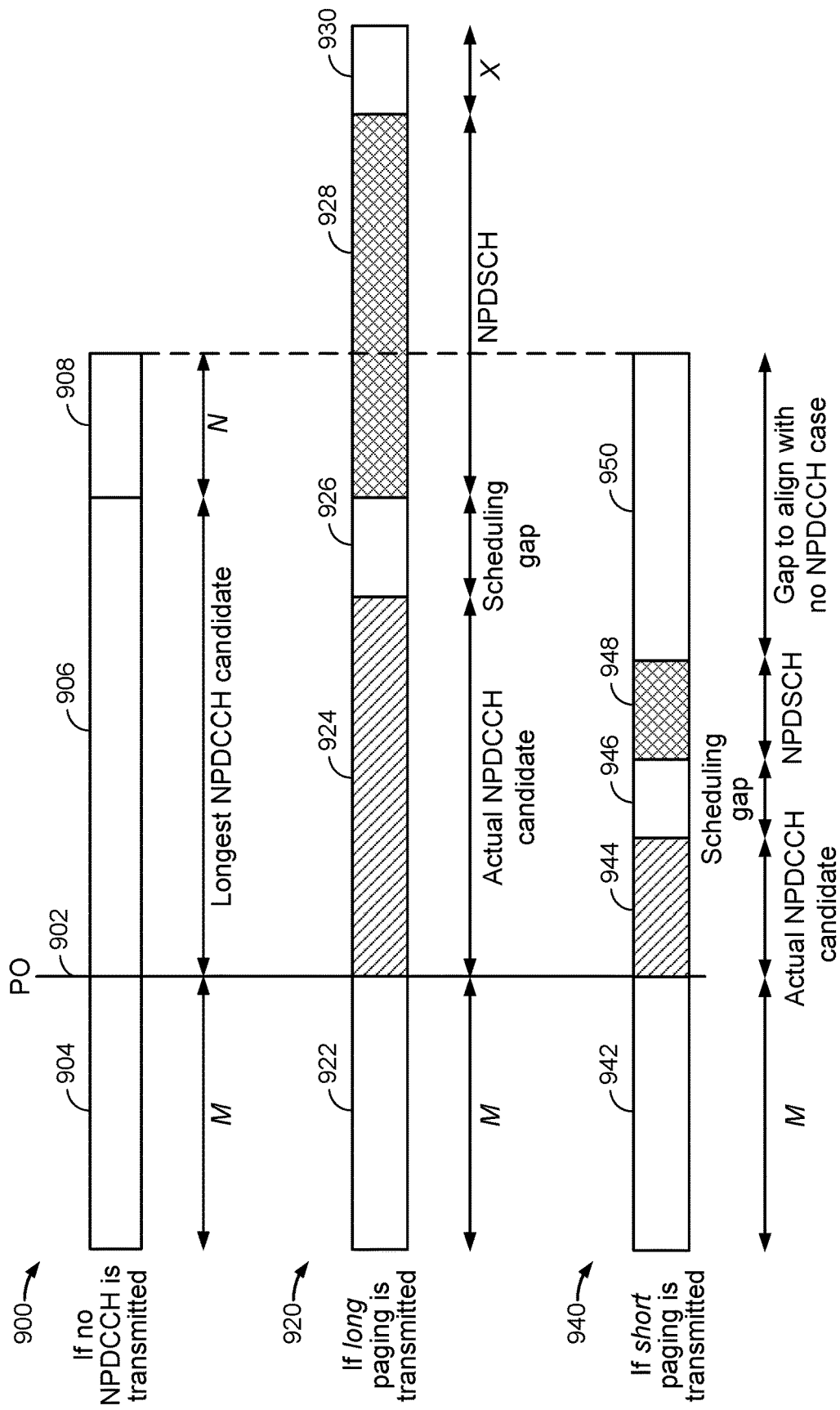
FIG. 9 shows exemplary transmission timelines, according to aspects of the present disclosure.

FIG. 9 shows exemplary transmission timelines 900, 920, and 940, according to aspects of the present disclosure. The exemplary transmission timelines show transmissions from a BS to a UE via non-anchor RBs over a period. In each of the transmission timelines, a paging occasion (PO) occurs at 902. While FIG. 9 shows a PO occurring, the present disclosure is not so limited, and a BS and a UE may transmit and/or receive according to similar transmission timelines when a RAR transmission or SC-PTM transmission occurs.

In the transmission timeline 900, a BS does not transmit an NPDCCH or NPDSCH to the UE. As described above with reference to FIG. 8, the BS determines to transmit NRS based on information that the PO 902 will occur or based on the occurrence of the PO and one or more narrowband transmission parameters. The BS determines to transmit NRS in M subframes before the PO at 904, in a number of subframes equivalent to a longest NPDCCH candidate at 906, and in N subframes after the longest NPDCCH candidate at 908. M and N are narrowband transmission parameters, as previously described. The BS may determine M and N by reference to a network communications standard.

According to aspects of the present disclosure, a UE may determine occurrence of NRS in non-anchor PRBs at 904, 906, and 908 based on the occurrence of the PO at 902. As described above with reference to FIG. 7, the UE determines, based on deciding that the PO 902 will occur or has occurred and one or more narrowband transmission parameters, that NRS occur in the non-anchor PRBs in M subframes before the PO at 904, in a number of subframes equivalent to a longest NPDCCH candidate at 906, and in N subframes after the longest NPDCCH candidate at 908. The UE may then process the NRS, as described above with reference to FIG. 7.

In the transmission timeline 920, a BS determines to schedule an NPDCCH scheduling an NPDSCH to the UE. The BS transmits the NPDCCH and the NPDSCH to the UE. As described above with reference to FIG. 8, the BS determines to transmit NRS based on information that the PO will occur or based on the occurrence of the PO, based on the determination to schedule the NPDCCH and NPDSCH to the UE, and based on one or more narrowband transmission parameters. The BS determines to transmit NRS in M subframes before the PO at 922, during the transmission of the NPDCCH at 924, during a scheduling gap 926 between the NPDCCH and the NPDSCH, during the NPDSCH at 928, and in X subframes after the end of the NPDSCH at 930. The length of the scheduling gap and X may be narrowband transmission parameters, as previously described. The BS may determine the length of the scheduling gap and X by reference to a network communications standard.

According to aspects of the present disclosure, a UE may determine occurrence of NRS in non-anchor PRBs at 922, 924, 926, 928, and 930 based on the occurrence of the PO at 902 and another transmission in the same RB as the PO. As described above with reference to FIG. 7, the UE determines, based on deciding that the PO 902 will occur or has occurred, one or more narrowband transmission parameters, and the NPDCCH 924 in the same RB as the PO, that NRS occur in the non-anchor PRBs during the transmission of the NPDCCH at 924, during a scheduling gap 926 between the NPDCCH and the NPDSCH, during the NPDSCH at 928, and in X subframes after the end of the NPDSCH at 930. The length of the scheduling gap and X may be narrowband transmission parameters, as previously described, that the UE may determine based on a SIB or by reference to a network communications standard. The UE may then process the NRS, as described above with reference to FIG. 7.

In the transmission timeline 940, a BS determines to schedule an NPDCCH scheduling an NPDSCH to the UE. The BS transmits the NPDCCH and the NPDSCH to the UE. As described above with reference to FIG. 8, the BS determines to transmit NRS based on information that the PO will occur or based on the occurrence of the PO, the determination to schedule the NPDCCH and NPDSCH to the UE, and one or more narrowband transmission parameters. The BS determines to transmit NRS in M subframes before the PO at 942, during the transmission of the NPDCCH at 944, during a scheduling gap 946 between the NPDCCH and the NPDSCH 948, and during the NPDSCH at 948. Because the length of the NPDCCH, scheduling gap, and NPDSCH is less than the longest NPDCCH candidate plus N, the BS transmits NRS during subframes 950 after the end of the NPDSCH. The BS determines to transmit NRS in a total number of subframes equivalent to a longest NPDCCH candidate and in N additional subframes, similar to the timeline 900. The length of the scheduling gap and N may be narrowband transmission parameters, as previously described. The BS may determine the length of the scheduling gap and N by reference to a network communications standard.

According to aspects of the present disclosure, a UE may determine occurrence of NRS in non-anchor PRBs at 904, 906, and 908 based on the occurrence of the PO at 902. As described above with reference to FIG. 7, the UE determines, based on deciding that the PO 902 will occur or has occurred, one or more narrowband transmission parameters, and the NPDCCH 944 in the same RB as the PO, that NRS occur in the non-anchor PRBs in M subframes before the PO at 942, in the same subframes as the NPDCCH at 944, during a scheduling gap 946 between the NPDCCH and the NPDSCH 948, and during the NPDSCH at 948. Because the length of the NPDCCH, scheduling gap, and NPDSCH is less than the longest NPDCCH candidate plus N, the UE also determines that NRS occur during subframes 950 after the end of the NPDSCH. The UE may then process the NRS, as described above with reference to FIG. 7.

According to aspects of the present disclosure, a BS may determine to transmit NRS in non-anchor PRBs around paging occasions, RAR transmissions, or SC-PTM transmissions for a UE that is operating on those non-anchor PRBs, but not for all paging occasions, RAR transmissions, or SC-PTM transmissions for all UEs. That is, a BS may support a plurality of UEs using a plurality of non-anchor PRBs, and the UEs may have differing POs, RAR transmissions, or SC-PTM transmissions on differing schedules. The BS may transmit NRS on a particular non-anchor PRB during a period (e.g., subframes) around a PO, RAR transmission, or SC-PTM transmission of the UE operating on the particular non-anchor PRB, but the BS does not transmit NRS on the non-anchor PRBs around POs, RAR transmissions, or SC-PTM transmissions of the other UEs.

According to aspects of the present disclosure, a UE may determine occurrence of an NRS in a non-anchor PRB based on whether a PO, RAR transmission, or SC-PTM transmission specific to the UE occurs during a particular period (e.g., a subframe). That is, a UE may have information regarding POs, RAR transmissions, or SC-PTM transmissions of multiple UEs, and determine whether NRS occur in a non-anchor PRB in a subframe based on whether a PO, RAR transmission, or SC-PTM transmission for the UE occurs in the subframe.

According to aspects of the present disclosure, a BS may determine to transmit NRS in non-anchor PRBs based on whether the BS has scheduled an NPDCCH for a UE operating on those non-anchor PRBs. If the BS has not determined to transmit an NPDCCH to a UE operating on a non-anchor PRB and does not page the UE, then the BS will not transmit NRS in the non-anchor PRB.

According to aspects of the present disclosure, a UE may determine occurrence of an NRS in non-anchor PRBs based on whether the UE detects an NPDCCH intended for the UE on those non-anchor PRBs. If the UE does not detect an NPDCCH to the UE on a non-anchor PRB, then the UE will not attempt to process NRS in the non-anchor PRB.

According to aspects of the present disclosure, a BS may similarly determine to transmit NRS and a UE may determine occurrence of NRS on carriers in which a random access response (RAR) is transmitted.

According to aspects of the present disclosure, a BS may determine to transmit NRS in non-anchor PRBs in periods around the end of one or more narrowband physical random access channel (NPRACH) resources or around the occurrence of a random access response (RAR) window. A BS (e.g., an eNB) may transmit NRS regardless of whether the BS detects NPRACH, so that the BS transmits NRS for use by a UE even when the eNB fails to detect an NPRACH and the UE that transmitted the NPRACH is monitoring for a random access response (RAR) and NRS.

According to aspects of the present disclosure, a BS may determine to transmit NRS in non-anchor PRBs in periods around the end of one or more narrowband physical random access channel (NPRACH) resources in which the BS detects an NPRACH signal from a UE or around the occurrence of a random access response (RAR) window. A BS (e.g., an eNB) may transmit NRS when the BS detects NPRACH, so that the BS transmits NRS for use by the UE that transmitted the NPRACH and is monitoring for a random access response (RAR) and NRS.

According to aspects of the present disclosure, a BS may determine to transmit NRS in non-anchor PRBs in periods around the end of one or more narrowband physical random access channel (NPRACH) resources in which the BS detects an NPRACH signal from a UE or around the occurrence of a random access response (RAR) window, if the BS determines to transmit an NPDCCH in the non-anchor PRBs. A BS (e.g., an eNB) may transmit NRS when the BS detects NPRACH and determines to schedule a transmission to the UE that transmitted the NPRACH, so that the BS transmits NRS for use by the UE to which the BS is scheduling transmissions.

In aspects of the present disclosure, valid downlink subframes for transmitting (e.g., by a BS) NPDCCH and/or NPDSCH bitmaps are signaled in SIB-NBs for non-anchor carriers (e.g., carrier frequencies for non-anchor RBs) for paging occasions and RAR messages.

According to aspects of the present disclosure, a UE may assume, for RAR monitoring (e.g., monitoring for a response message after transmitting a RACH), that NRS are present in subframes 0, 4, and 9 of a frame for an in-band (e.g., on the non-anchor RBs) RAR message. Similarly, a BS may transmit NRS in subframes 0, 4, and 9 of a frame after receiving an in-band RACH message.

In aspects of the present disclosure, a UE may assume, for RAR monitoring, that NRS are present in subframes 0, 1, 3, 4, and 9 of a frame for a standalone or guard-band RAR message. Similarly, a BS may transmit NRS in subframes 0, 1, 3, 4, and 9 of a frame after receiving a standalone or guard-band RACH message.

According to aspects of the present disclosure, a UE may assume, for RAR monitoring, that NRS are present for ten valid DL subframes before the start of each Type-2 common search space (CSS) in the RAR window, four valid DL subframes after the end of each Type-2 CSS in the RAR window, four valid DL subframes prior to a first subframe of an NPDSCH carrying RAR messages, and four valid DL subframes after the NPDSCH carrying the RAR messages. Similarly, a BS may transmit NRS in ten valid DL subframes immediately preceding the start of a Type-2 CSS in the RAR window, four valid DL subframes after the end of each Type-2 CSS in the RAR window, four valid DL subframes prior to a first subframe of an NPDSCH carrying RAR messages, and four valid DL subframes after the NPDSCH carrying the RAR messages.

In aspects of the present disclosure, a UE may assume that NRS are present on a non-anchor carrier (e.g., a carrier of a non-anchor RB) from ten valid subframes prior to a first subframe of a type-1 CSS, in an NPDCCH candidate in which the UE finds a DCI scrambled by a paging radio network temporary identifier (P-RNTI), and in four valid subframes after the NPDCCH. Similarly, a BS may transmit NRS on a non-anchor carrier for ten valid subframes prior to the start of a type-1 CSS, during an NPDCCH that the BS scrambles with a P-RNTI (e.g., an NPDCCH that pages a UE), and in four valid subframes after the type-1 CSS.

According to aspects of the present disclosure, a UE may assume that NRS are present on a non-anchor carrier (e.g., a carrier of a non-anchor RB) in four valid subframes prior to the first subframe of an NPDSCH carrying paging messages, during the subframe(s) carrying the NPDSCH, and in four valid subframes after the NPDSCH. Similarly, a BS transmitting an NPDSCH carrying a paging message may transmit NRS in four valid subframes before the first subframe of the NPDSCH, during the subframe(s) carrying the NPDSCH, and in four valid subframes after the NPDSCH.

In aspects of the present disclosure, a UE may assume that NRS are present on a non-anchor carrier in ten valid subframes prior to the first subframe of a Type-1A CSS or a Type-2A CSS. In addition, the UE may assume that NRS are present on the non-anchor carrier in four valid subframes after the end of the Type-1A CSS or the end of the Type-2A CSS. Similarly, a BS transmitting a signal on a non-anchor carrier for detection in a Type-1A CSS or a Type-2A CSS may transmit NRS in ten valid subframes prior to the first subframe of the Type-1A CSS or the Type-2A CSS and in four valid subframes after the Type-1A CSS or the Type-2A CSS.

According to aspects of the present disclosure, a UE may assume that NRS are present on a non-anchor carrier in four valid subframes before and in four valid subframes after an NPDSCH carrying single cell multicast control channel (SC-MCCH) single cell multicast transport channel (SC-MTCH) (e.g., SC-PTM transmissions). Similarly, a base station transmitting an NPDSCH carrying SC-MCCH or SC-MTCH on a non-anchor subcarrier may transmit MRS on the non-anchor subcarrier in four valid subframes before and in four valid subframes after the NPDSCH.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an application-specific integrated circuit (ASIC). The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

For example, means for determining, means for processing, means for indicating, and/or means for including, may comprise a processing system, which may include one or more processors, such as the transmit processor 220, the TX MIMO processor 230, and/or the controller/processor 240 of the BS 110 illustrated in FIG. 2, and/or the transmit processor 264, the TX MIMO processor 266, and/or the controller/processor 280 of the user equipment 120 illustrated in FIG. 2. Means for transmitting and/or means for sending may comprise a transmitter, which may include the transmit processor 220, the TX MIMO processor 230, the modulators 232, the controller/processor 240, and/or the antenna(s) 234 of the BS 110 illustrated in FIG. 2, and/or the transmit processor 264, the TX MIMO processor 266, the modulators 254, the controller/processor 280, and/or the antenna(s) 252 of the user equipment 120 illustrated in FIG. 2. Means for receiving may comprise a receiver, which may include the receive processor 258, the MIMO detector 256, the demodulators 254, the controller/processor 280, and/or the antenna(s) 252 of the UE 120 illustrated in FIG. 2, and/or the receive processor 238, the MIMO detector 236, the demodulators 234, the controller/processor 240, and/or the antenna(s) 232 of the base station 110 illustrated in FIG. 2.

In one or more exemplary designs, the functions described may be implemented in hardware, software/firmware or combinations thereof. If implemented in hardware, the functions may be implemented in one or more circuits, including but not limited to a transmitter circuit, a receiver circuit, a transceiver circuit, and/or a multi-processor circuit. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
deciding that a starting subframe for a paging occasion (PO), a random access response (RAR) transmission, or a single cell point to multipoint (SC-PTM) transmission will occur or has occurred;
determining occurrence of a narrowband reference signal (NRS) in a non-anchor resource block (RB) based on at least a length of a narrowband physical downlink control channel (NPDCCH) candidate and a minimum number of subframes, N, for transmission of NRSs after the end of the NPDCCH candidate; and
processing the NRS in at least the length plus N subframes after the PO, the RAR transmission, or the SC-PTM transmission.

2. The method of claim 1, further comprising:
further processing the NRS in at least a minimum number of subframes, M, for transmission of NRSs before the PO, the RAR transmission, or the SC-PTM transmission.

3. The method of claim 1, wherein determining occurrence of the NRS in the non-anchor RB is further based on at least the NPDCCH, and the method further comprises:
deciding that the NRS is not present in the non-anchor RB; and
determining, based on the decision that the NRS is not present in the non-anchor RB, that the NPDCCH is not present in one or more subframes after the PO, the RAR transmission, or the SC-PTM transmission.

4. The method of claim 1, wherein the length of the NPDCCH candidate comprises
a length of a longest NPDCCH candidate.

5. A method for wireless communications by a user equipment (UE), comprising:
deciding that a starting subframe for a paging occasion (PO), a random access response (RAR) transmission, or a single cell point to multipoint (SC-PTM) transmission will occur or has occurred;
determining occurrence of a narrowband reference signal (NRS) in a non-anchor resource block (RB) based on at least:
a narrowband physical downlink control channel (NPDCCH) and a narrowband physical downlink shared channel (NPDSCH), and
a duration of a scheduling gap and a minimum number of subframes, X, for transmission of NRSs after the end of the NPDSCH, wherein the non-anchor RB occurs a number of subframes after the PO, the RAR transmission, or the SC-PTM transmission, wherein the number is less than or equal to a sum of:
a duration of the NPDCCH,
the duration of the scheduling gap,
a duration of the NPDSCH, and
X;
determining the duration of the NPDCCH, the duration of the scheduling gap, the duration of the NPDSCH, and X; and
processing the NRS during a period comprising the duration of the NPDCCH, the duration of the scheduling gap, the duration of the NPDSCH, and X subframes after the end of the NPDSCH.

6. The method of claim 5, wherein the NPDCCH indicates an allocation of transmission resources for the NPDSCH, the NPDSCH comprises a random access response (RAR) message, and the method further comprises:
receiving the NPDCCH;
receiving the NPDSCH via the allocated transmission resources; and
obtaining the RAR message from the NPDSCH.

7. A method for wireless communications by a base station (BS), comprising:
determining whether to schedule one or more transmissions to a user equipment (UE);
deciding that a starting subframe for a paging occasion (PO), a random access response (RAR) transmission, or a single cell point to multipoint (SC-PTM) transmission will occur or has occurred;
determining to transmit a narrowband reference signal (NRS) in a non-anchor resource block (RB) based on at least a length of a narrowband physical downlink control channel (NPDCCH) candidate and a minimum number of subframes, N, for transmission of NRSs after the end of the NPDCCH candidate; and
transmitting the NRS in the non-anchor RB in at least the length plus N subframes after the PO, the RAR transmission, or the SC-PTM transmission.

8. The method of claim 7, further comprising
further transmitting NRSs in at least a minimum number of subframes, M, for transmission of NRSs before the PO, the RAR transmission, or the SC-PTM transmission.

9. The method of claim 7, wherein the length of the NPDCCH candidate comprises a length of a longest NPDCCH candidate.

10. The method of claim 7, wherein determining to transmit the NRS in the non-anchor RB is further based on the NPDCCH, and the method further comprises:
transmitting the NRS in each of the one or more subframes used for transmitting the NPDCCH.

11. The method of claim 10, wherein the NPDCCH indicates an allocation of transmission resources for a narrowband physical downlink shared channel (NPDSCH), and the method further comprises:
transmitting the NPDSCH via the allocated transmission resources in one or more subframes after the NPDCCH;
transmitting the NRS in each of one or more subframes between transmitting the NPDCCH and transmitting the NPDSCH; and
transmitting the NRS in each of the one or more subframes used for transmitting the NPDSCH.

12. The method of claim 11, further comprising:
determining that a first sum of a number of the subframes used for transmitting the NPDCCH, a number of the subframes between transmitting the NPDCCH and the NPDSCH, and a number of the subframes used for transmitting the NPDSCH is less than a second sum of a length of a longest NPDCCH candidate N; and
transmitting the NRS in a number of subframes, after the PO, the RAR transmission, or the SC-PTM transmission, wherein the number is equal to the second sum.

13. A method for wireless communications by a base station (BS), comprising:
determining whether to schedule one or more transmissions to a user equipment (UE);
deciding that a starting subframe for a paging occasion (PO), a random access response (RAR) transmission, or a single cell point to multipoint (SC-PTM) transmission will occur or has occurred;
determining to transmit a narrowband reference signal (NRS) in a non-anchor resource block (RB) based on at least:

a narrowband physical downlink control channel (NPDCCH) and a narrowband physical downlink shared channel (NPDSCH), and a duration of a scheduling gap and a minimum number of subframes, X, for transmission of NRSs after the end of the NPDSCH;

transmitting NRSs in a number of subframes after the PO, the RAR transmission, or the SC-PTM transmission, wherein the number is greater than or equal to a sum of:

a duration of the NPDCCH, the duration of the scheduling gap, a duration of the NPDSCH, and

X.

14. The method of claim 13, wherein the NPDCCH indicates an allocation of transmission resources for the NPDSCH and the method further comprises:

transmitting the NPDCCH;

encoding a random access response (RAR) message to generate a portion of the NPDSCH; and transmitting the NPDSCH via the allocated transmission resources.

15. An apparatus for wireless communications, comprising:

a processor configured to:

decide that a starting subframe for a paging occasion (PO), a random access response (RAR) transmission, or a single cell point to multipoint (SC-PTM) transmission will occur or has occurred;

determine occurrence of a narrowband reference signal (NRS) in a non-anchor resource block (RB) based on at least a length of a narrowband physical downlink control channel (NPDCCH) candidate and a minimum number of subframes, N, for transmission of NRSs after the end of the NPDCCH candidate and process the NRS in at least the length plus N subframes after the PO, the RAR transmission, or the SC-PTM transmission; and a memory coupled with the processor.

16. The apparatus of claim 15, the processor further configured to:

further process the NRS in at least a minimum number of subframes, M, for transmission of NRSs before the PO, the RAR transmission, or the SC-PTM transmission.

17. The apparatus of claim 15, wherein the processor is further configured to:

determine occurrence of the NRS in the non-anchor RB further based on at least the NPDCCH;

decide that the NRS is not present in the non-anchor RB; and determine, based on the decision that the NRS is not present in the non-anchor RB, that the NPDCCH is not present in one or more subframes after the PO, the RAR transmission, or the SC-PTM transmission.

18. The apparatus of claim 15, wherein the length of the NPDCCH candidate comprises a length of a longest NPDCCH candidate.

19. An apparatus for wireless communications, comprising:

a processor configured to:

decide that a starting subframe for a paging occasion (PO), a random access response (RAR) transmission, or a single cell point to multipoint (SC-PTM) transmission will occur or has occurred;

determine occurrence of a narrowband reference signal (NRS) in a non-anchor resource block (RB) based on at least:

a narrowband physical downlink control channel (NPDCCH) and a narrowband physical downlink shared channel (NPDSCH), and a duration of a scheduling gap and a minimum number of subframes, X, for transmission of NRSs after the end of the NPDSCH, wherein the non-anchor RB occurs a number of subframes after the PO, the RAR transmission, or the SC-PTM transmission, wherein the number is less than or equal to a sum of:

a duration of the NPDCCH, the duration of the scheduling gap, a duration of the NPDSCH, and

X;

determine the duration of the NPDCCH, the duration of the scheduling gap, the duration of the NPDSCH, and X; and process the NRS during a period comprising the duration of the NPDCCH, the duration of the scheduling gap, the duration of the NPDSCH, and X subframes after the end of the NPDSCH.

20. The apparatus of claim 19, wherein the NPDCCH indicates an allocation of transmission resources for the NPDSCH, the NPDSCH comprises a random access response (RAR) message, and the processor is further configured to:

receive the NPDCCH;

receive the NPDSCH via the allocated transmission resources; and obtain the RAR message from the NPDSCH.

21. An apparatus for wireless communications, comprising:

a processor configured to:

determine whether to schedule one or more transmissions to a user equipment (UE);

decide that a starting subframe for a paging occasion (PO), a random access response (RAR) transmission, or a single cell point to multipoint (SC-PTM) transmission will occur or has occurred;

determine to transmit a narrowband reference signal (NRS) in a non-anchor resource block (RB) based on at least a length of a narrowband physical downlink control channel (NPDCCH) candidate and a minimum number of subframes, N, for transmission of NRSs after the end of the NPDCCH candidate; and transmit the NRS in the non-anchor RB in at least the length plus N subframes after the PO, the RAR transmission, or the SC-PTM transmission; and a memory coupled with the processor.

22. The apparatus of claim 21, the processor further configured to:

further transmit NRSs in at least a minimum number of subframes, M, for transmission of NRSs before the PO, the RAR transmission, or the SC-PTM transmission.

23. The apparatus of claim 21, wherein the length of the NPDCCH candidate comprises a length of a longest NPDCCH candidate.

24. The apparatus of claim 21, the processor further configured to:

transmit the NPDCCH and transmit the NRS in each of the one or more subframes used for transmitting the NPDCCH.

25. The apparatus of claim 24, wherein the NPDCCH indicates an allocation of transmission resources for a narrowband physical downlink shared channel (NPDSCH), and the processor is further configured to:

transmit the NPDSCH via the allocated transmission resources in one or more subframes after the NPDCCH;

transmit the NRS in each of one or more subframes between transmitting the NPDCCH and transmitting the NPDSCH; and transmit the NRS in each of the one or more subframes used for transmitting the NPDSCH.

26. The apparatus of claim 25, wherein the processor is further configured to:

determine that a first sum of a number of the subframes used for transmitting the NPDCCH, a number of the subframes between transmitting the NPDCCH and the NPDSCH, and a number of the subframes used for transmitting the NPDSCH is less than a second sum of a length of a longest NPDCCH candidate and N; and transmit the NRS in a number of subframes, after the PO, the RAR transmission, or the SC-PTM transmission, wherein the number is equal to the second sum.

27. An apparatus for wireless communications, comprising:

a processor configured to:

determine whether to schedule one or more transmissions to a user equipment (UE);

decide that a starting subframe for a paging occasion (PO), a random access response (RAR) transmission, or a single cell point to multipoint (SC-PTM) transmission will occur or has occurred;

determine to transmit a narrowband reference signal (NRS) in a non-anchor resource block (RB) based on at least:

a narrowband physical downlink control channel (NPDCCH) and a narrowband physical downlink shared channel (NPDSCH), and a length of a scheduling gap and a minimum number of subframes, X, for transmission of NRSs after the end of the NPDSCH; and transmit NRSs in a number of subframes after the PO, the RAR transmission, or the SC-PTM transmission, wherein the number is greater than or equal to a sum of:

a length of the NPDCCH, the length of the scheduling gap, a length of the NPDSCH, and

X.

28. The apparatus of claim 27, wherein the NPDCCH indicates an allocation of transmission resources for the NPDSCH, and the processor is further configured to:

transmit the NPDCCH;

encode a random access response (RAR) message to generate a portion of the NPDSCH; and transmit the NPDSCH via the allocated transmission resources.

* * * * *